US011824841B2

(12) United States Patent
Slovetskiy (10) Patent No.: US 11,824,841 B2
(45) Date of Patent: Nov. 21, 2023

(54) SECURE TRANSPORT SESSION RESUMPTION FOR CONSTRAINED DEVICES

(71) Applicant: T-Mobile USA, Inc., Bellevue, WA (US)

(72) Inventor: Sergey Slovetskiy, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 465 days.

(21) Appl. No.: 16/996,472

(22) Filed: Aug. 18, 2020

(65) Prior Publication Data

US 2022/0060450 A1 Feb. 24, 2022

(51) Int. Cl.
*H04L 9/40* (2022.01)
*H04L 9/08* (2006.01)

(52) U.S. Cl.
CPC ........ *H04L 63/0428* (2013.01); *H04L 9/0819* (2013.01); *H04L 63/166* (2013.01)

(58) Field of Classification Search
CPC ... H04L 63/0428; H04L 63/08; H04L 63/061; H04L 67/02; H04L 67/306; H04L 63/0861; H04L 63/102; H04L 65/60; H04L 9/0819; G06F 21/10; G06F 21/602; G06F 2221/2107; G06F 17/30867; G06F 21/105; H04N 21/4627; H04N 21/84; H04N 21/2353; H04N 21/2387; H04N 21/25816; H04N 21/233; H04N 21/23439; H04N 21/2393; H04N 21/4126; H04N 21/41407
USPC ......... 713/151, 150, 163, 181; 726/2, 21, 36
See application file for complete search history.

(56) References Cited

U.S. PATENT DOCUMENTS

| 7,587,598 | B2 * | 9/2009 | Ohba ..................... | H04L 63/08 713/169 |
| 7,917,758 | B2 * | 3/2011 | Palekar .................. | H04L 63/08 709/227 |
| 8,843,738 | B2 * | 9/2014 | Vos ........................ | H04L 69/22 709/224 |

(Continued)

OTHER PUBLICATIONS

Internet Engineering Task Force, "Datagram Transport Layer Security Version 1.2", available at <<https://tools.ietf.org/pdf/rfc6347.pdf>>, Jan. 2012, 32 pages.

(Continued)

*Primary Examiner* — Sharif E Ullah
(74) *Attorney, Agent, or Firm* — Lee & Hayes, P.C.

(57) ABSTRACT

A constrained device, such as an Internet of Things (IoT) device, can use a handshake procedure to establish a secure transport session with a server and generate a corresponding client session state. The constrained device can encrypt the client session state into an encrypted client session state, and transmit the encrypted client session state to the server. When the constrained device enters an idle mode, the client session state may be cleared from memory of the constrained device. However, when the constrained device next wakes from the idle mode and re-enters an active mode, the constrained device can retrieve the encrypted client session state from the server. The constrained device can decrypt the encrypted client session state to recover the client session state, and use the recovered client session state to resume the secure transport session instead of establishing a new secure transport session with a new client session state.

17 Claims, 5 Drawing Sheets

(56) References Cited

U.S. PATENT DOCUMENTS

| | | | | |
|---|---|---|---|---|
| 9,026,784 B2* | 5/2015 | Buruganahalli | ........ | H04L 63/20 |
| | | | | 713/176 |
| 9,608,963 B2* | 3/2017 | Lu | ........................... | H04L 67/14 |
| 10,009,183 B2* | 6/2018 | Pahl | ....................... | G06F 21/33 |
| 10,162,943 B2* | 12/2018 | Park | ........................ | H04L 63/08 |
| 11,502,830 B2* | 11/2022 | Cannon | ................. | H04B 11/00 |
| 2003/0174842 A1* | 9/2003 | Challener | ............. | H04L 63/061 |
| | | | | 380/277 |
| 2005/0132204 A1* | 6/2005 | Gouguenheim | ...... | H04L 9/0877 |
| | | | | 713/193 |
| 2007/0057048 A1* | 3/2007 | Plotkin | ................... | G06F 21/78 |
| | | | | 235/382 |
| 2008/0109642 A1* | 5/2008 | Beutler | ............... | G06F 11/1637 |
| | | | | 712/225 |
| 2009/0328177 A1* | 12/2009 | Frey | ..................... | H04L 9/3213 |
| | | | | 726/9 |
| 2010/0017615 A1* | 1/2010 | Boesgaard Sorensen | ................... | |
| | | | | G06F 21/554 |
| | | | | 713/176 |
| 2010/0257578 A1* | 10/2010 | Shukla | ................ | G06F 21/6218 |
| | | | | 726/1 |
| 2011/0145581 A1* | 6/2011 | Malhotra | .............. | H04L 9/3271 |
| | | | | 725/91 |
| 2012/0324552 A1* | 12/2012 | Padala | .................. | H04L 9/3213 |
| | | | | 726/6 |
| 2013/0198509 A1* | 8/2013 | Buruganahalli | .... | H04L 63/1408 |
| | | | | 713/151 |
| 2013/0219178 A1* | 8/2013 | Xiques | ................... | H04L 65/70 |
| | | | | 713/168 |
| 2013/0318358 A1* | 11/2013 | Wang | ................... | H04L 9/0866 |
| | | | | 713/182 |
| 2014/0079221 A1* | 3/2014 | McCallum | ........... | H04L 9/0822 |
| | | | | 380/277 |
| 2014/0331297 A1* | 11/2014 | Innes | .................. | H04L 63/0823 |
| | | | | 726/7 |
| 2015/0222697 A1* | 8/2015 | Bassiouny | .............. | H04L 65/65 |
| | | | | 709/203 |
| 2017/0316185 A1* | 11/2017 | Park | .................... | H04L 63/0428 |
| 2020/0058341 A1* | 2/2020 | Villa | ................... | G11C 11/2255 |
| 2022/0060450 A1* | 2/2022 | Slovetskiy | ........... | H04L 9/0894 |

OTHER PUBLICATIONS

Internet Engineering Task Force, "The Transport Layer Security (TLS) Protocol Version 1.2", available at <<https://tools.ietf.org/pdf/rfc5246.pdf>>, Aug. 2008, 104 pages.

Internet Engineering Task Force, "Transport Layer Security (TLS) Extensions", available at <<https://tools.ietf.org/pdf/rfc4366.pdf>>, Apr. 2006, 30 pages.

Internet Engineering Task Force, "Transport Layer Security (TLS) Session Resumption without Server-Side State", available at <<https://tools.ietf.org/pdf/rfc5077.pdf>>, Jan. 2008, 20 pages.

* cited by examiner

SECURE TRANSPORT SESSION RESUMPTION FOR CONSTRAINED DEVICES

BACKGROUND

Secure transport sessions can be established over a network to transfer data between computing endpoints. For example, a secure transport session can be established between a client computing device and a server using Transport Layer Security (TLS), Datagram Transport Layer Security (DTLS), or other security protocols. When such a secure transport session has been established between endpoints, the endpoints can use the secure transport session to exchange encrypted data.

In some examples, a constrained device can be an endpoint that uses a secure transport session to send encrypted data to a server. For instance, an Internet of Things (IoT) device, or other constrained device, may use a TLS session or DTLS session to report measurements or other data to an IoT server. A constrained device may have a smaller amount of processing power, memory, and/or other computing resources than personal computers, smartphones, or other types of computing devices.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Introduction

Constrained devices often have limited amounts of computing resources, relative to other types of computing devices. For example, constrained devices may have less powerful processors, lower amounts of memory, and/or fewer amounts of other types of computing resources than smartphones, personal computers, or other types of computing devices.

In many cases, constrained devices have limited amounts of computing resources in order to extend battery life of the constrained devices. For example, constrained devices can include Internet of Things (IoT) devices, such as sensors, actuators, meters, municipal infrastructure equipment, and other types of IoT devices, which may be deployed in the field for extended periods of time without being connected to an external power source. Such IoT devices can have relatively low-powered processors and/or low amounts of memory, such that the IoT devices use less energy than other types of devices during operation and thus run on battery power for extended periods of time.

Constrained devices may use a data connection, such as a wireless connection to a telecommunication network, to exchange data with a server or another device. For example, an IoT sensor may take measurements and transmit the measurements to an IoT server. In many examples, constrained devices may use secure transport sessions to exchange data with another device. For instance, a constrained device may use a Transport Layer Security (TLS) session or a Datagram TLS (DTLS) session with a server when sending or receiving data.

Handshake procedures used to initially establish such secure transport sessions may be relatively complex computationally, and/or involve relatively high amounts of network traffic. For example, during an initial handshake procedure for a new secure transport session, a client device and/or a server may perform relatively complex operations to generate cryptographic keys that will be used to encrypt and decrypt data transmitted during the secure transport session. The client device and the server may also exchange messages during the initial handshake procedure, for example to agree on cryptographic algorithms and other parameters for the secure transport session.

While constrained devices may have sufficient processing power to perform the operations of a handshake procedure during initial setup of a secure transport session, the operations of the handshake procedure may use a relatively large amount of energy. Accordingly, battery life of a constrained device may be negatively impacted if the constrained device frequently needs to perform a full set of handshake procedure operations to establish new secure transport sessions. As an example, an IoT sensor may occasionally wake from a low-power idle state to take and report measurements to an IoT server, and then return to the idle state. However, battery life of the IoT sensor may be negatively impacted if the IoT sensor has to perform computationally intensive operations associated with the handshake procedure to establish new secure transport sessions with the server each time the IoT sensor wakes to report new measurements.

Some solutions have been developed that allow devices to resume previously-established secure transport sessions, and thus avoid the full set of handshake procedure operations at later points in time after secure transport sessions have previously been established. For example, IETF RFC 5077 describes an abbreviated handshake procedure that allows a client device to resume a previously-established secure transport session with a server. In the abbreviated handshake procedure described by IETF RFC 5077, a client device can save session state data about a secure transport session established with a server. The client device can then, at a later point in time, use the saved session state data to resume the previously-established secure transport session with the server, without performing a full set of handshake procedure operations that would be associated with initiating a new secure transport session.

However, although the abbreviated handshake procedure described by IETF RFC 5077 may be useful for client devices that have greater amounts of computing resources than constrained devices, constrained devices often do not have sufficient memory resources to perform the abbreviated handshake procedure described by IETF RFC 5077. As an example, constrained devices may have limited amounts of memory, and thus be unable to store session state data in memory as IETF RFC 5077 describes. Additionally, some constrained devices clear at least some data from memory when moving to a low-power idle state. Accordingly, any session state data about an established secure transport session that is stored in short-term memory of a constrained device may be lost when the constrained device enters the idle state. When the constrained device next wakes from the idle state, the constrained device may be unable to use the session state data cleared from memory to resume the secure transport session according to IETF RFC 5077. The server may also be unable to perform the operations assigned to the client device in IETF RFC 5077, because the server would be unaware of when the constrained device next wakes from the idle state, and the server thus could not initiate the abbreviated handshake procedure of IETF RFC 5077 based on the constrained device re-entering an active state.

The systems and methods described herein allow a constrained device to resume a previously-established secure transport session upon waking, without performing a full set of handshake procedure operations upon waking, and without storing session state data in memory while the constrained device is idle. The systems and methods described herein can therefore extend battery life of the constrained device by allowing the constrained device to avoid performing some computationally-intensive operations of a full handshake procedure each time the constrained device wakes, even if the constrained device is unable to store session state data while it is in a low-power idle state.

Example Environment

Figure 1:
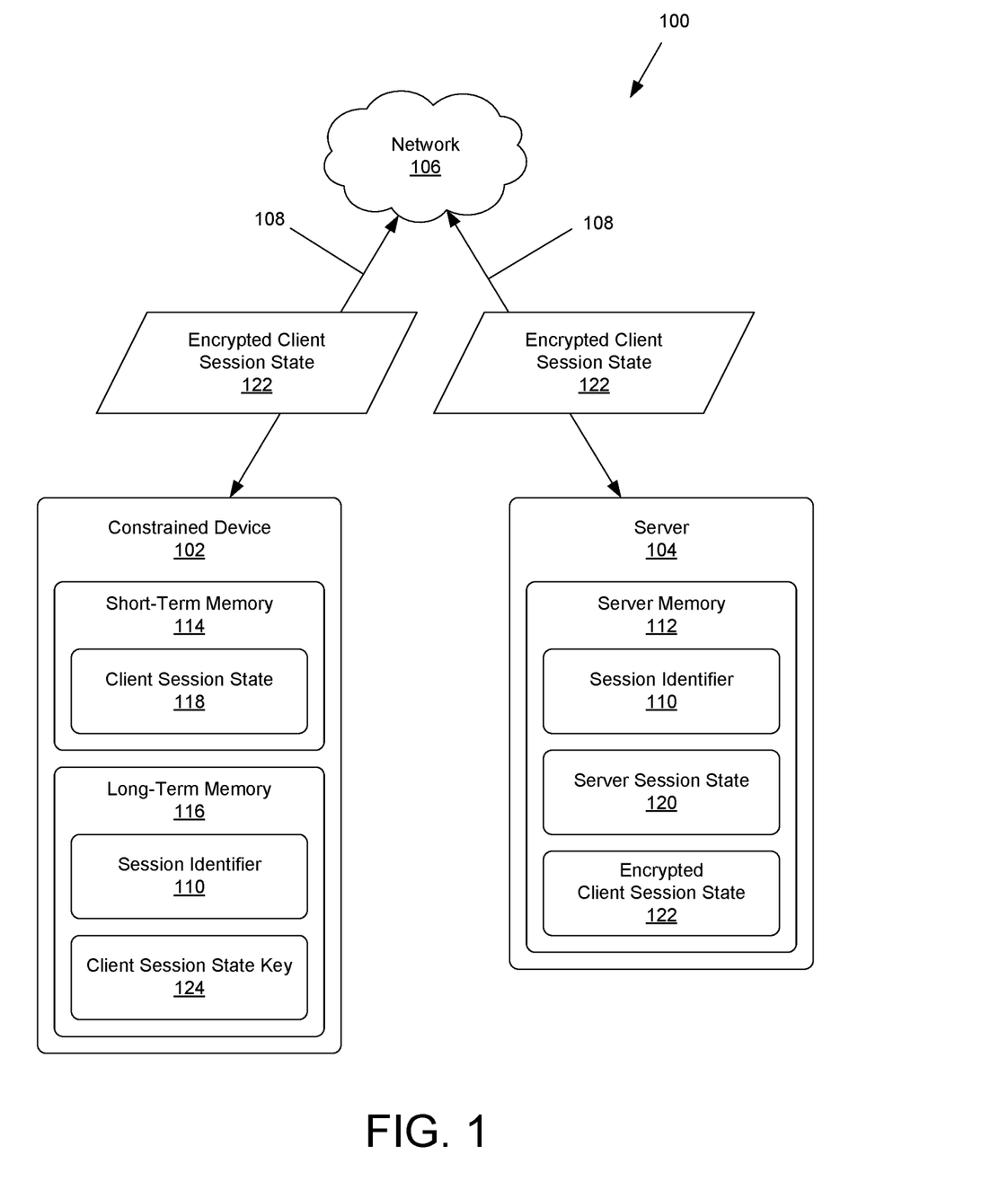
FIG. 1 shows an example in which a constrained device can communicate with a server via a network.

FIG. 1 shows an example 100 in which a constrained device 102 can communicate with a server 104 via a network 106. The constrained device 102 may be an IoT device, or other type of device, that is configured to establish a secure transport session 108 with the server 104 via the network 106. For example, the constrained device 102 and the server 104 can establish a secure transport session 108 so that the constrained device 102 can use the secure transport session 108 to send encrypted data to the server 104. The secure transport session 108 can be a TLS session, a DTLS session, or a secure transport session established using any other security protocol. An example system architecture for the constrained device 102 is described below with respect to FIG. 3.

The server 104 can be an IoT server or other computing device configured to receive data from the constrained device 102 via the secure transport session 108. For example, when the constrained device 102 is an IoT sensor that can take measurements associated with an environment surrounding the IoT sensor, the server 104 can be configured to receive reports of such measurements from the IoT sensor via the secure transport session 108. In this example, the server 104 may store the received measurements, analyze the received measurements, aggregate the received measurements with measurements received from other IoT sensors, provide the received measurements to other devices, and/or perform any other operations. An example system architecture for the server 104 is described below with respect to FIG. 4.

In some examples, the server 104 can be one of a distributed set of servers 104 that are configured to communicate with the constrained device 102 and/or other devices. For example, the distributed set of servers 104 can include multiple instances of the server 104, such that the constrained device 102 can communicate with any instance of the server 104 in the distributed set. As will be described in more detail below, after the constrained device 102 has established the secure transport session 108 with an instance of the server 104, in these examples the constrained device 102 may later resume the secure transport session 108 with the same or a different instance of the server 104 in the distributed set.

The network 106 can include the Internet, a telecommunication network, and/or other types of networks. In some example, the constrained device 102 can wirelessly connect to a base station or other access point connected to the network 106, and can send and/or receive data via the network 106. For example, the constrained device 102 can wirelessly connect to a base station of an access network of a telecommunication network, which can in turn connect the constrained device 102 to a core network of the telecommunication network and/or the Internet, through which the constrained device 102 can communicate with the server 104.

In some examples, a connection between the constrained device 102 and the network 106 can be based on one or more radio access technologies, wireless access technologies, protocols, and/or standards. Wireless and radio access technologies, protocols, and standards can include fifth generation (5G) technology, Long Term Evolution (LTE)/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, Wi-Fi® technology, and/or any other previous or future generation of radio access technology.

The constrained device 102 may have limited computing resources relative to smartphones, personal computers, or other types of computing devices. For example, the constrained device 102 can be an IoT device or other device that has a low-power processor and/or low amounts of memory in order to extend battery life of the constrained device 102, to reduce the cost of the constrained device 102, and/or for any other reason. For example, relative to smartphones or other types of mobile computing devices, the constrained device 102 may have a less powerful processor, lower amounts of system memory, and/or other constrained computing resources that are configured to use lower amounts of battery power during operation.

Additionally, to extend battery life, in some examples the constrained device 102 can be configured use data transmission methods or protocols that may be less computationally-intensive than, and/or are associated with lower power consumption than, other types of data transmission methods or protocols. The constrained device 102 may be considered a Lightweight Machine-2-Machine (LwM2M) client device. For instance, in some examples the constrained device 102 can be configured to send and receive data at an application layer using a Constrained Application Protocol (CoAP) designed for constrained devices and/or LwM2M devices. As another example, the constrained device 102 can also be configured to send and receive application layer messages using an asynchronous, connectionless, and/or stateless transport layer protocol, such as the User Datagram Protocol (UDP). Such transport layer protocols, such as UDP, such may be less computationally intensive than the Transmission Control Protocol (TCP) or other connection-oriented transport layer protocols, and may thereby assist in extending battery life of the constrained device 102.

Additionally, in some examples, the constrained device 102 can be considered to be a NarrowBand (NB) IoT device. NB-IoT devices can be configured to use a relatively narrow spectrum of frequencies to wirelessly send and/or receive data over long distances using relatively low data transfer rates. NB-IoT devices are often used when data transmissions are expected to be infrequent and/or small. For example, an NB-IoT industrial sensor may configure the sensor to only send a few bytes of data on infrequent occasions when the sensor detects a particular condition in its surrounding environment. An NB-IoT device can accordingly be considered low-power constrained device 102 and/or a LwM2M client device, because it can send and receive infrequent and/or small data transmissions using relatively little amounts of power.

The constrained device 102 can be configured to save energy and/or computing resources by primarily operating in a low-power idle state, but occasionally or periodically waking into a higher-power active state to transmit data to the server 104 and/or perform other operations. For example, the constrained device 102 can be an IoT device that is configured to wake from the low-power idle state into the active state to take measurements and transmit the measurements to the server 104, and then return to the low-power idle state when not taking or transmitting measurements.

The constrained device 102 may use a secure transport session 108, such as a TLS or DTLS session, to send data to the server 104. For example, when a UDP connection is used for the secure transport session 108, DTLS security protocol may be used such that the secure transport session 108 is a DTLS session.

To initially establish the secure transport session 108, the constrained device 102 and the server 104 may perform a handshake procedure. For example, the handshake procedure may include the constrained device 102 sending a request to the server 104 to initiate the secure transport session 108, the constrained device 102 and the server 104 associating a session identifier 110 with the secure transport session 108, the constrained device 102 and the server 104 agreeing on a cipher suite that will be associated with the secure transport session 108, the constrained device 102 and the server 104 generating session keys to be used during the secure transport session 108, and/or establishing other parameters associated with the secure transport session.

As an example, during the initial handshake procedure, the constrained device 102 and the server 104 can agree on a cipher suite that includes a set of algorithms to be used in association with the secure transport session 108, such as a key exchange algorithm, a bulk encryption algorithm, a message authentication code algorithm, and/or an authentication algorithm. The key exchange algorithm may be used by the constrained device 102 and the server 104 to generate cryptographic session keys that can be used to encrypt and decrypt data transmitted during the secure transport session 108. For example, the key exchange algorithm can be an RSA algorithm, a Diffie-Hellman algorithm, an Elliptic-curve Diffie-Hellman (ECDH) algorithm, a pre-shared key (PSK) agreement, or another type of key exchange algorithm or agreement. The bulk encryption algorithm can be an algorithm used to encrypt data sent during the secure transport session 108 using the session keys. The message authentication code algorithm can a hash function, error checking function, or other algorithm that can be used to check the integrity of data sent during the secure transport session 108, for instance to determine if the data changed during transit. The authentication algorithm may be used to authenticate the constrained device 102 and/or the server 104. The cipher suite may also include other parameters or data, such as an identifier of a protocol associated with the secure transport session 108, such as TLS or DTLS, digital signatures of the constrained device 102 and/or the server 104, and/or other data.

The secure transport session 108 can be established upon completion of the initial handshake procedure, and the constrained device 102 and the server 104 can use the secure transport session 108 to exchange encrypted data. For example, the constrained device 102 can encrypt data using a session key generated during the handshake procedure, and can send the encrypted data to the server 104 via the secure transport session 108. The server 104 can then receive and decrypt the data based on a session key generated during the handshake procedure.

Based on the initial handshake procedure, the constrained device 102 and the server 104 can each store the session identifier 110 associated with the secure transport session 108 in memory. For example, the server 104 can store the session identifier 110 in a server memory 112 of the server 104. In some examples in which the server 104 is an instance of the server 104 in a distributed set of servers 104, the server memory 112 may be a global cache, database, or other memory that is accessible by any instance of the server 104 in the distributed set. For example, if a first instance of the server 104 performs operations of the handshake procedure to establish the secure transport session 108 with the constrained device 102, the first instance of the server 104 may store the session identifier 110 in a global cache such that other instances can access the session identifier 110 from the global cache in the future.

The constrained device 102 can also store the session identifier 110 in memory of the constrained device 102. In some examples, the memory of the constrained device 102 may include both short-term memory 114 and long-term memory 116. The short-term memory 114 may be random-access memory (RAM) or another type of volatile memory that can store data while the constrained device 102 is in the active state, but that does not store data when the constrained device 102 is in the low-power idle state. Accordingly, data stored in the short-term memory 114 when the constrained device 102 is in the active state may be deleted or lost when the constrained device 102 moves from the active state to the low-power idle state. The long-term memory 116 may be flash memory or another type of non-volatile memory that can store data in both the active state and low-power idle state, such that data stored in the long-term memory 116 is not lost when the constrained device 102 enters the low-power idle state. In these examples, the constrained device 102 may store the session identifier 110 in the long-term memory 116 of the constrained device 102.

The constrained device 102 and the server 104 can also, based on the handshake procedure, store session state data associated with the secure transport session 108 in memory. The constrained device 102 can store a client session state 118 in memory of the constrained device 102. In some examples, the constrained device 102 can temporarily store the client session state 118 in the short-term memory 114, as discussed further below. The server 104 can also store a server session state 120 in the server memory 112.

The client session state 118 can include data that the constrained device 102 uses during the secure transport session 108, and/or data that that the constrained device 102 received or generated during the initial handshake procedure. For example, the client session state 118 can include one or more of: an identifier of the cipher suite chosen during the initial handshake procedure, an identifier of the type and/or version number of the security protocol associated with the secure transport session 108, a master secret used by the constrained device 102 to generate session keys for the secure transport session 108, copies of generated session keys for the secure transport session 108, a digital certificate or other authentication data associated with the server 104, or any other data that the constrained device 102 receives from the server 104 during the initial handshake procedure, that the constrained device 102 generates during the initial handshake procedure, and/or that the constrained device 102 uses when sending or receiving data during the secure transport session 108.

The server session state 120 can include similar types of data that the server 104 uses during the secure transport session 108, and/or data that that the server 104 received or generated during the initial handshake procedure. For example, the server session state 120 can include one or more of: an identifier of the cipher suite chosen during the initial handshake procedure, an identifier of the type and/or version number of the security protocol associated with the secure transport session 108, a master secret used by the server 104 to generate session keys for the secure transport session 108, copies of generated session keys for the secure transport session 108, identity and/or authentication data associated with the constrained device 102, or any other data that the server 104 receives from the constrained device 102 during the initial handshake procedure, that the server 104 generates during the initial handshake procedure, and/or that the server 104 uses when sending or receiving data during the secure transport session 108. As discussed above, in some examples the server memory 112 may be a global cache, or other shared memory, associated with a distributed set of servers 104. Accordingly, the server session state 120 stored in the server memory 112 can be accessible by the instance of the server 104 that performed the handshake procedure and/or initially generated the server session state 120, as well as by other instances of the server 104 in the distributed set.

As discussed above, the constrained device 102 may have both short-term memory 114 and long-term memory 116. In such examples, the constrained device 102 can store the session identifier 110 of the secure transport session 108 in the long-term memory 116 following the initial handshake procedure. However, the constrained device 102 may not have sufficient long-term memory 116 to store the client session state 118, and may instead temporarily store the client session state 118 in the short-term memory 114. The constrained device 102 can use information in the client session state 118, temporarily stored in the short-term memory 114, to send or receive data via the secure transport session 108 while the constrained device 102 is in the active state. For instance, the constrained device 102 may encrypt data to be sent to the server 104 based on session keys indicated in, or derivable from, the client session state 118. However, the client session state 118 temporarily stored in the short-term memory 114 can be deleted or lost when the constrained device 102 changes from the active state to the idle state and data is cleared from the short-term memory 114.

Accordingly, before the client session state 118 is cleared from the short-term memory 114, the constrained device 102 can encrypt the client session state 118 into an encrypted client session state 122. In some examples, the encrypted client session state 122 can be referred to as a client session ticket. The constrained device 102 can transmit the encrypted client session state 122 to the server 104 to be stored in the server memory 112. The server 104 can store the encrypted client session state 122 in the server memory 112 in association with the session identifier 110 for the secure transport session 108, and/or with a corresponding connection identifier used by the server 104. In examples in which the server memory 112 is a global cache, or other shared memory, associated with a distributed set of servers 104, the server can store the encrypted client session state 122 in the server memory 112 such that the encrypted client session state 122 is later accessible by any instance of the server 104 in the distributed set.

Although the client session state 118 may be cleared from the short-term memory 114 when the constrained device 102 enters the idle state, the constrained device 102 can later retrieve the encrypted client session state 122 from the server 104, or another instance of the server 104, when the constrained device 102 next wakes and enters the active state. The constrained device 102 can decrypt the encrypted client session state 122 to recover the original client session state 118. The constrained device 102 may again temporarily store the recovered client session state 118 in the short-term memory 114 while the constrained device 102 is in the active state. The constrained device 102 can use data in the recovered client session state 118 to resume the previously-established secure transport session 108 with the server 104, or another instance of the server 104. The constrained device 102 can accordingly use the recovered client session state 118 to resume the previously established secure transport session 108 without agreeing on a new cipher suite with the server 104 as part of a full handshake procedure, without generating new session keys based on a new master secret as part of the full handshake procedure, without performing other computationally complex operations associated with the full handshake procedure, and without exchanging additional messages over the network 106 during the full handshake procedure.

To encrypt the client session state 118 into the encrypted client session state 122, the constrained device 102 can generate at least one client session state key 124. The at least one client session state key 124 can be a cryptographic key or cryptographic key pair. The constrained device 102 can then use the at least one client session state key 124 to encrypt the client session state 118 into the encrypted client session state 122, and to decrypt the encrypted client session state 122 to recover the client session state 118. The constrained device 102 may also use the at least one client session state key 124 to protect the integrity of the data in the encrypted client session state 122. The constrained device 102 can store the client session state key 124 in the long-term memory 116, such that the constrained device 102 continues to store the client session state key 124 when the constrained device 102 enters the idle state.

In some examples, the at least one client session state key 124 can be a "one-time" key that is associated with the duration of the secure transport session 108. Accordingly, the constrained device 102 may use the same client session state key 124 in association with the secure transport session 108, but may generate and use a different client session state key 124 if a new secure transport session 108 is later established instead of resuming the previously-established secure transport session 108.

The constrained device 102 may keep the client session state key 124 secret from the server 104, and/or does not share information with the server 104 from which the server 104 could derive the client session state key 124. Accordingly, although the server 104 can receive and store the encrypted client session state 122, the server 104 may not be able to decrypt the encrypted client session state 122.

Figure 2:
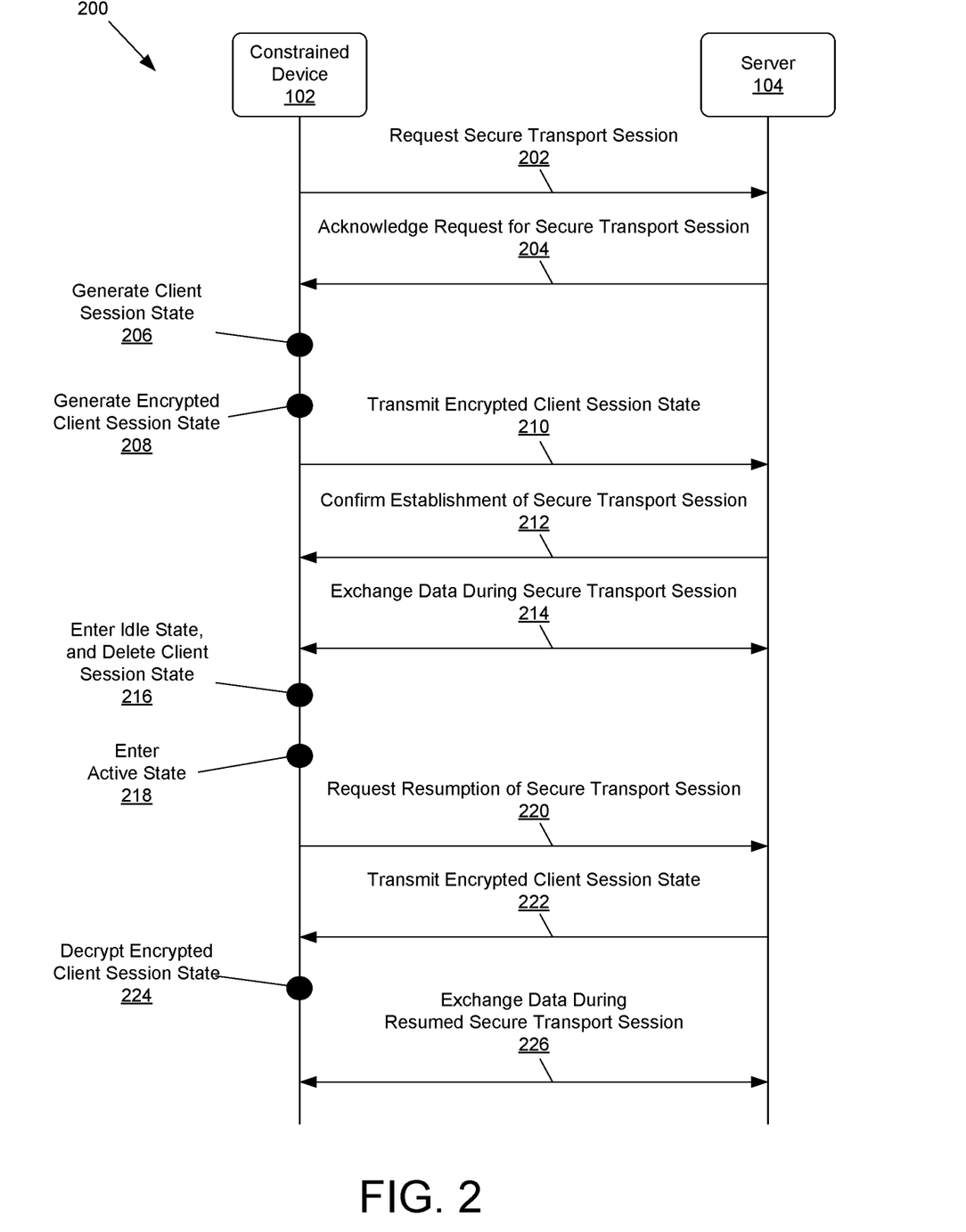
FIG. 2 shows a sequence diagram of steps associated with establishing and resuming a secure transport session.

FIG. 2 shows a sequence diagram 200 of steps associated with establishing and resuming a secure transport session 108. At step 202, the constrained device 102 can initiate the secure transport session 108 by sending a request message to the server 104. For example, the request message that the constrained device 102 sends to the server 104 at step 202 can be a "ClientHello" message, or any other type of message signifying that the constrained device 102 is requesting a new secure transport session 108 with the server 104. In some examples, the request message sent by the constrained device 102 at step 202 can indicate one or more security protocols that the constrained device 102 supports, one or more cipher suites that the constrained device 102 supports, and/or other data that the server 104 can use to establish and use the requested secure transport session 108.

In some examples, the constrained device 102 can include a client-initiated session resumption capability parameter within the request message sent at step 202. The client-initiated session resumption capability parameter can be a flag, value, TLS extension, or other data that indicates to the server 104 that the constrained device 102 supports resuming a previously-established secure transport session 108, based on a client session state 118 that the constrained device 102 decrypts from an encrypted client session state 122 received from the server 104. In some examples, the client-initiated session resumption parameter can be indicated by a "ClientSessionTicket" TLS extension in a "ClientHello" message, a "client_side=0" parameter in a "ClientHello" message, or any other parameter in a "ClientHello" message or other request sent at step 202.

At step 204, the constrained device 102 can receive an acknowledgement message from the server 104 in response to the constrained device's request message. For example, the server 104 can transmit an acknowledgement message to the constrained device 102 at step 204, such as a "ServerHello" message or any other type of acknowledgement message. In some examples, the server's acknowledgement message can include a digital certificate associated with the server 104, an indicator of a specific cipher suite selected by the server 104 for the secure transport session 108, the session identifier 110 that will be associated with the secure transport session 108, and/or other data that the constrained device 102 can use to establish and use the requested secure transport session 108.

In some examples, the server 104 can include a client-initiated session resumption capability acknowledgement parameter within the acknowledgement message returned at step 204. The client-initiated session resumption capability acknowledgement parameter can indicate that the server 104 supports storing an encrypted client session state 122 received from the constrained device 102 in the server memory 112, and supports returning the encrypted client session state 122 to the constrained device 102 when requested by the constrained device 102. In some examples, the client-initiated session resumption capability acknowledgement parameter can be indicated in a "ClientSessionTicket" TLS extension in a "ServerHello" message, a "client_side=0" parameter in a "ServerHello" message, or any other parameter in a "ServerHello" message or other acknowledgement message sent at step 204.

At step 206, the constrained device 102 can generate a client session state 118 based on information about the secure transport session 108. The constrained device 102 can generate the client session state 118 at step 206 based on information sent or received during steps 202 and 204. In some examples, the constrained device 102 and server 104 may exchange additional messages or information to authenticate each other, establish other parameters of the secure transport session 108, and/or perform other operations associated with a handshake procedure for the secure transport session 108. Accordingly, the constrained device 102 can also generate the client session state 118 further based on such additional messages or operations. The constrained device 102 can store the client session state 118 in memory, such as in the short-term memory 114.

For example, the client session state 118 can include an identifier of a cipher suite selected by the server 104 for the secure transport session 108 that was identified in the acknowledgement message received at step 206. The constrained device 102 may also generate session keys for the secure transport session 108 using a master secret based on the selected cipher suite. Accordingly, the client session state 118 may include a copy of the master secret used to generate the session keys, and/or copies of the generated session keys. The client session state 118 may also identify the type and/or version number of the security protocol associated with the secure transport session 108, a digital certificate or other authentication data associated with the server 104, or any other data associated with the secure transport session 108.

At step 208, the constrained device 102 can generate an encrypted client session state 122. For example, the constrained device 102 can generate at least one client session state key 124 at step 208, and use the at least one client session state key 124 to encrypt the client session state 118 into the encrypted client session state 122. The constrained device 102 can also, in some examples, use the at least one client session state key 124 to protect the integrity of the data in the encrypted client session state 122. The constrained device 102 can store the at least one client session state key 124 in the long-term memory 116, along with the session identifier 110 associated with the secure transport session 108. In some examples, the constrained device 102 may temporarily store the encrypted client session state 122 in the short-term memory 114 at least until the encrypted client session state 122 is sent to the server 104. In some examples, the encrypted client session may be referred to as a client session ticket.

At step 210, the constrained device 102 can transmit the encrypted client session state 122 to the server 104 via the network 106. For example, the constrained device 102 can transmit transport parameters associated with the secure transport session 108 to the server 104 at step 210, and the constrained device 102 can include the encrypted client session state 122 in the transport parameters sent to the server 104.

The constrained device 102 can transmit the encrypted client session state 122 to the server 104 in association with the session identifier 110 for the secure transport session 108. The server 104 can accordingly store the encrypted client session state 122 in the server memory 112, in association with the session identifier 110 and/or a corresponding connection identifier. The server 104 may also store a server session state 120 associated with the secure transport session 108 in the server memory 112, in association with the session identifier 110 and/or the corresponding connection identifier.

In some examples, the constrained device 102 can transmit the encrypted client session state 122 to the server 104 in, or after, a "ClientKeyExchange" message or other message, prior to sending a "ChangeCipherSpec" message and/or a "Finished" message to the server 104. The server 104 can accordingly store the encrypted client session state 122 as a client session ticket in the server memory 112, along with the corresponding server session state 120. In some examples, the server 104 may store the encrypted client session state 122 as a client session ticket in the server memory 112 after verifying the "Finished" message sent by the constrained device 102.

As discussed above, in some examples the server 104 can be an instance of the server 104 in a distributed set of servers 104. In these examples, the instance of the server 104 can store the encrypted client session state 122 and the server session state 120, in association with the session identifier 110 and/or a corresponding connection identifier, in a global cache or other shared server memory 112 accessible by multiple instances of the server 104 in the distributed set. Accordingly, any server 104 in the distributed set can later retrieve the encrypted client session state 122 and the server session state 120 from the shared server memory 112 using the session identifier 110 or the corresponding connection identifier, and resume the previously-established secure transport session 108 with the constrained device 102.

At step 212, the constrained device 102 can receive a confirmation from the server 104 acknowledging that the secure transport session 108 has been established and is ready to be used. For example, the confirmation from the server 104 received at step 212 can be a confirmation of transport parameters, including the encrypted client session state 122, sent by the constrained device 102 at step 210. The confirmation received at step 212 can therefore signal the end of an initial handshake procedure to establish the secure transport session 108.

At step 214, the constrained device 102 and the server 104 can use the newly established secure transport session 108 to exchange data. For example, the constrained device 102 may use session keys indicated in, or derivable from, the client session state 118 to encrypt data and send the encrypted data to the server 104 via the secure transport session 108.

At step 216, the constrained device 102 can enter an idle state that clears the short-term memory 114 of the constrained device 102. For example, the constrained device 102 may have performed steps 202 through 214 while in an active state, but at step 216 the constrained device 102 may change from the active state to a low-power idle state. The constrained device 102 may stay in the idle state for a period of time until the constrained device 102 next awakens and re-enters the active state. The short-term memory 114 may be configured to be cleared upon entering the idle state. Accordingly, at step 216, the client session state 118 stored in the short-term memory 114 at step 206 can be deleted or lost. If a copy of the encrypted client session state 122 had been stored in the short-term memory 114, the copy of the encrypted client session state 122 can also be cleared from the short-term memory at step 216.

At step 218, the constrained device 102 can wake and re-enter the active state. For example, if the constrained device 102 is an IoT sensor, the IoT sensor make wake from the idle state into the active state on an occasional or periodic basis to take and report new measurements to the server 104, or the same or a different instance of the server 104 in a distributed set of servers 104. Upon waking and re-entering the active state at step 218, the constrained device 102 may not have a copy of the client session state 118, because the short-term memory was cleared when the constrained device 102 entered the idle state at step 216. However, the session identifier 110 and the client session state key 124 may still be stored in the long-term memory 116 of the constrained device 102 when the constrained device 102 wakes and re-enters the active state at step 218.

To avoid performing steps 202 through 212 again as part of a full handshake procedure upon re-entering the active state, at step 220 the constrained device 102 can send a request message to the server 104, or another instance of the server 104, that requests resumption of the previously-established secure transport session 108.

In some examples, the request message sent at step 220 can be similar to the request message sent by the constrained device 102 at step 202, but may include one or more parameters or other indicators that signal to the server 104 that the constrained device 102 is requesting resumption of the previously-established secure transport session 108. For example, the request message can be a "ClientHello" message that includes one or more parameters that directly or indirectly signify a request to resume the previously-established secure transport session 108. For example, the constrained device 102 may include the session identifier 110 associated with the previously-established secure transport session 108 in the request message. Inclusion of the session identifier 110 associated with a previous secure transport session 108 in the request message sent at step 220 can at least partially signify to the server 104 that the request message is a resumption request, and is not a request to initiate a new secure transport session 108. In some examples, the constrained device 102 may include a client-initiated session resumption parameter in the request message sent by the constrained device at step 220, such as a "ClientSessionTicket" TLS extension, a "client_side=1" parameter, or any other parameter.

In some examples, the constrained device 102 may additionally include a session resumption parameter in the request message that explicitly signifies to the server 104 that the constrained device 102 is requesting resumption of the previously-established secure transport session 108. For instance, the constrained device 102 can include the session identifier 110, the client-initiated session resumption parameter, and an explicit session resumption parameter in a "ClientHello" message. However, in other examples, an explicit session resumption parameter may be omitted from the request message sent at step 220, but a combination of other parameters in the request message can signal to the server 104 that the constrained device is requesting resumption of the previously-established secure transport session 108. For example, the combination of the session identifier 110 and the client-initiated session resumption parameter in a "ClientHello" message can signal to the server 104 that the "ClientHello" message is a request to resume the secure transport session 108 associated with the session identifier 110, and is not a request to establish a new secure transport session 108.

Based on the request message sent by the constrained device 102 at step 220, the server 104 can determine that the constrained device 102 is requesting resumption of the previously-established secure transport session 108 associated with the session identifier 110. Based on the client-initiated session resumption parameter in the request message sent at step 220, the server 104 can also determine that the constrained device 102 is capable of resuming the secure transport session 108 using a decrypted form of the encrypted client session state 122 stored in the server memory 112.

The server 104 can accordingly use the session identifier 110, or a corresponding connection identifier, to locate and/or retrieve the server session state 120 and the encrypted client session state 122 associated with the secure transport session 108 in the server memory 112. In examples in which the server 104 is part of a distributed set of servers 104, the server 104 may use the session identifier 110 or the corresponding connection identifier to retrieve the server session state 120 and the encrypted client session state 122 associated with the secure transport session 108 from a global cache or other shared server memory 112 accessible by any server 104 in the distributed set of servers 104.

At step 222, the constrained device 102 can receive the encrypted client session state 122 from the server 104. The encrypted client session state 122 can be received by the constrained device 102 in, or after, an acknowledgement message sent by the server 104 in response to the request message sent at step 220. For example, if the constrained device 102 sends a "ClientHello" message at step 220, the server 104 may transmit the encrypted client session state 122 as a client session ticket in, or after, a "ServerHello" message sent in response to the "ClientHello" message. The acknowledgement message returned by the server 104 at step 222 may also include other parameters and data, such as the session identifier 110 and a client-initiated session resumption capability acknowledgement parameter indicated by a "ClientSessionTicket" TLS extension, a "client_side=1" parameter, or other parameter.

At step 224, the constrained device 102 can recover the client session state 118 by using the at least one client session state key 124 to decrypt the encrypted client session state 122 received at step 222. The constrained device 102 can validate the decrypted client session state 118, and can store the recovered client session state 118 in the short-term memory 114. In some examples, the constrained device 102 may also transmit a "ChangeCipherSpec" message, transmit other transport parameters to the server 104, and/or transmit a "Finished" message following recovery of the client session state 118 to indicate to the server 104 that the constrained device 102 is ready to use the resumed secure transport session 108.

At step 226, the constrained device 102 can resume using the previously-established secure transport session 108 based on the client session state 118 recovered at step 224. For example, the constrained device 102 can use session keys indicated in, or derivable from, the recovered client session state 118 to encrypt data and send the encrypted data to the server 104 via the previously-established secure transport session 108.

At a later point in time, the constrained device 102 may again enter the idle state as discussed above with respect to step 216, such that the client session state 118 is again cleared from the short-term memory 114. However, when the constrained device 102 awakens again and re-enters the active state, the constrained device can again follow steps 218 through 226 to recover the client session state 118 and resume the previously-established secure transport session 108.

Accordingly, after an initial handshake procedure associated with steps 202 through steps 214 has been completed, any time thereafter when the constrained device 102 wakes from an idle state into the active state at step 218, the constrained device 102 can use steps 220 through 226 to recover the previously-generated client session state 118 from the encrypted client session state 122 stored in the server memory 112. The constrained device 102 can thus use the recovered and previously-generated client session state 118 to resume the previously-established secure transport session 108. This can allow the constrained device 102 to, upon waking into the active state, avoid computationally and/or energy intensive operations associated with performing a full handshake procedure and generating an entirely new client session state 118.

In some examples, the constrained device 102 can use less energy when resuming a previously-established secure transport session 108 based on a previously-generated client session state 118 recovered from a server 104 using steps 220 through 226, relative to energy usage associated with the constrained device 102 performing the operations of the full handshake procedure at steps 202 through 212. For example, the constrained device 102 can use the previously-generated client session state 118 recovered at step 224 to resume the secure transport session 108, rather than performing relatively energy-intensive computations to generate a new client session state 118. Accordingly, the constrained device 102 resuming a previously-established secure transport session 108 based an encrypted client session state 122 received from a server 104 can, in some examples, extend battery life of the constrained device 102.

Additionally, the constrained device 102 and the server 104 may exchange fewer messages over the network 106 when the constrained device 102 requests and receives the encrypted client session state 122 from a server 104 upon waking into the active state, relative to the number of messages that may be exchanged over the network 106 during a full handshake procedure. For example, although the full handshake procedure may involve at least four network messages being exchanged between the constrained device 102 and a server at steps 202, 204, 210, and 212, in some cases the resumption of the secure transport session 108 described herein may involve the exchange of as few as two network messages at steps 220 and 222. Accordingly, the constrained device 102 resuming the previously-established secure transport session 108 based an encrypted client session state 122 received from a server 104 can, in some examples, reduce the amount of traffic sent over the network 106.

Example Architecture

Figure 3:
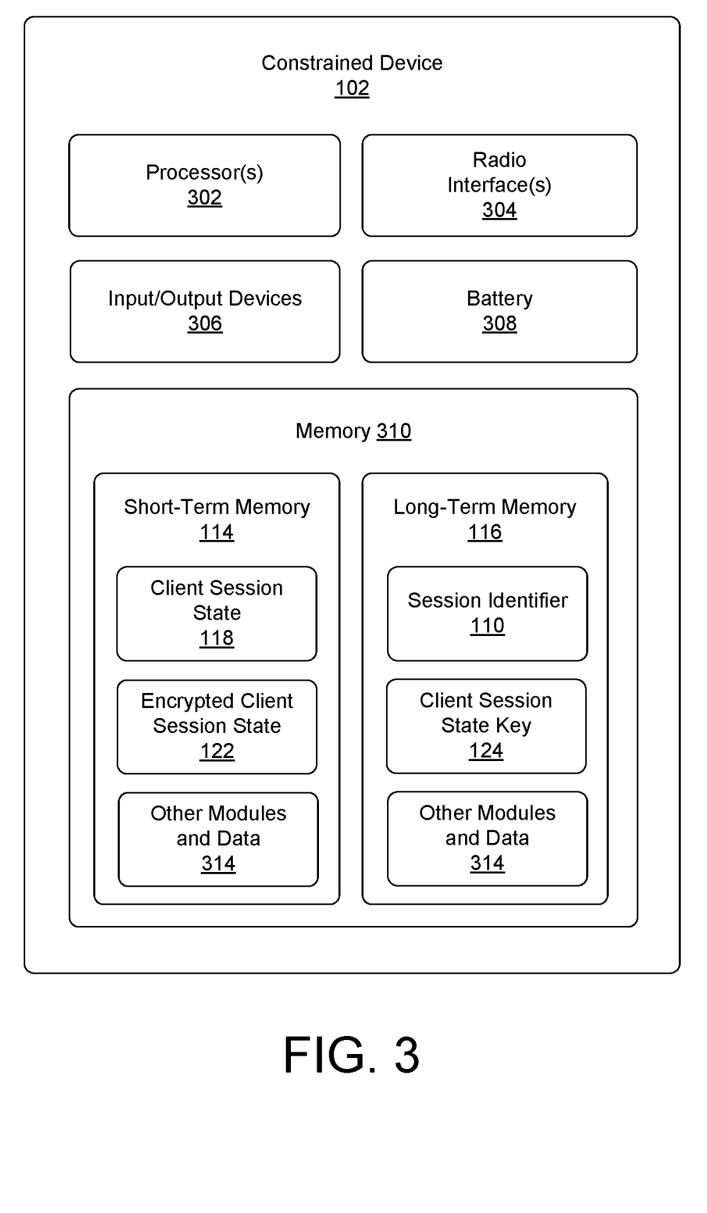
FIG. 3 shows an example system architecture for a constrained device.

FIG. 3 shows an example system architecture for a constrained device 102. As shown, the constrained device 102 can include processor(s) 302, radio interfaces 304, input and/or output devices 306, a battery 308, and/or memory 310. As discussed above, in some examples the memory 310 of the constrained device 102 may include short-term memory 114 and long-term memory 116.

In various examples, the processor(s) 302 can be a central processing unit (CPU), a graphics processing unit (GPU), both CPU and GPU, or any other type of processing unit. Each of the one or more processor(s) 302 may have one or more arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 302 may also be responsible for executing computer applications and/or instructions stored in the memory 310, which can include volatile and/or nonvolatile memory.

The radio interfaces 304 can include transceivers, modems, interfaces, antennas, and/or other components that perform or assist in exchanging radio frequency (RF) communications with an access point through which the constrained device 102 can connect to the network 106. The constrained device 102 can thus send and receive data via the radio interfaces 304 to establish, engage in, and resume the secure transport session 108 as described herein.

In some examples, the radio interfaces 304 can be configured to use a relatively narrow spectrum of frequencies to wirelessly send and/or receive data over long distances using relatively low data transfer rates, such that the constrained device 102 is considered to be an NB-IoT device. In some examples, the radio interfaces 304 can also be configured to perform LwM2M communications, for example by sending and receiving CoAP messages via an asynchronous, connectionless, and/or stateless transport layer protocol such as UDP.

Depending on the nature of the constrained device 102, the constrained device 102 can have one or more input devices 306 and/or output devices 306. Input devices 306 can be sensors, cameras, microphones, user input devices, and/or any other input device through which a constrained device 102 can obtain data about its environment and/or receive data from users or other devices. For example, when the constrained device 102 is a "smart" parking meter, it can include one or more sensors that can detect whether a parking space is vacant. Measurements, sensor readings, captured audio, images, video, or any other data obtained by the input devices 306 can be stored in memory 310, such as in the short-term memory 114, and can be transmitted by the radio interfaces 304 to the server 104 or other network destinations. Some constrained devices 102 may have output devices 306, such as screens or speakers, through which they can display or otherwise output data.

The battery 308 can provide power to the processor(s) 302, radio interfaces 304, input and output devices 306, and/or any other components of the constrained device 102. In some examples, the battery 308 can store enough energy to power the constrained device 102 for an extended period of time without recharging or replacement.

The memory 310 can include system memory, which may be volatile (such as RAM), non-volatile (such as ROM, flash memory, etc.) or some combination of the two. For example, the short-term memory 114 may be volatile, while the long-term memory 116 may be non-volatile. The memory 310 can further include machine readable media and/or non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by the constrained device 102. Any such non-transitory computer-readable media may be part of the constrained device 102.

The memory 310 can store the session identifier 110, the client session state 118, the client session state key 124, the encrypted client session state 122, and/or other modules and data 314. The constrained device 102 may also store data to be sent to the server 104, and/or that is received from the server 104, in the memory 310. In some examples, the constrained device 102 may at least temporarily store the client session state 118 and/or the encrypted client session state 122 in the memory 310, such as in the short-term memory 114. The constrained device 102 may also store the session identifier 110 and the client session state key 124 in the long-term memory 116. The constrained device 102 may store other modules and data 314 in either, or both, the short-term memory 114 and the long-term memory 116. The other modules and data 314 can be utilized by the constrained device 102 to perform or enable performing any action taken by the constrained device 102. The other modules and data 314 can include a constrained device platform, operating system, firmware, and applications, and/or data utilized by the platform, operating system, firmware, applications, or other elements of the constrained device 102.

The constrained device 102 can have one or more sets of instructions, such as software or firmware, that embodies any one or more of the methodologies or functions described herein. The instructions can reside, completely or at least partially, within the memory 310, processor(s) 302, and/or radio interface(s) 304 during execution thereof by the constrained device 102. The memory 310 and the processor(s) 302 also can constitute machine readable media.

Figure 4:
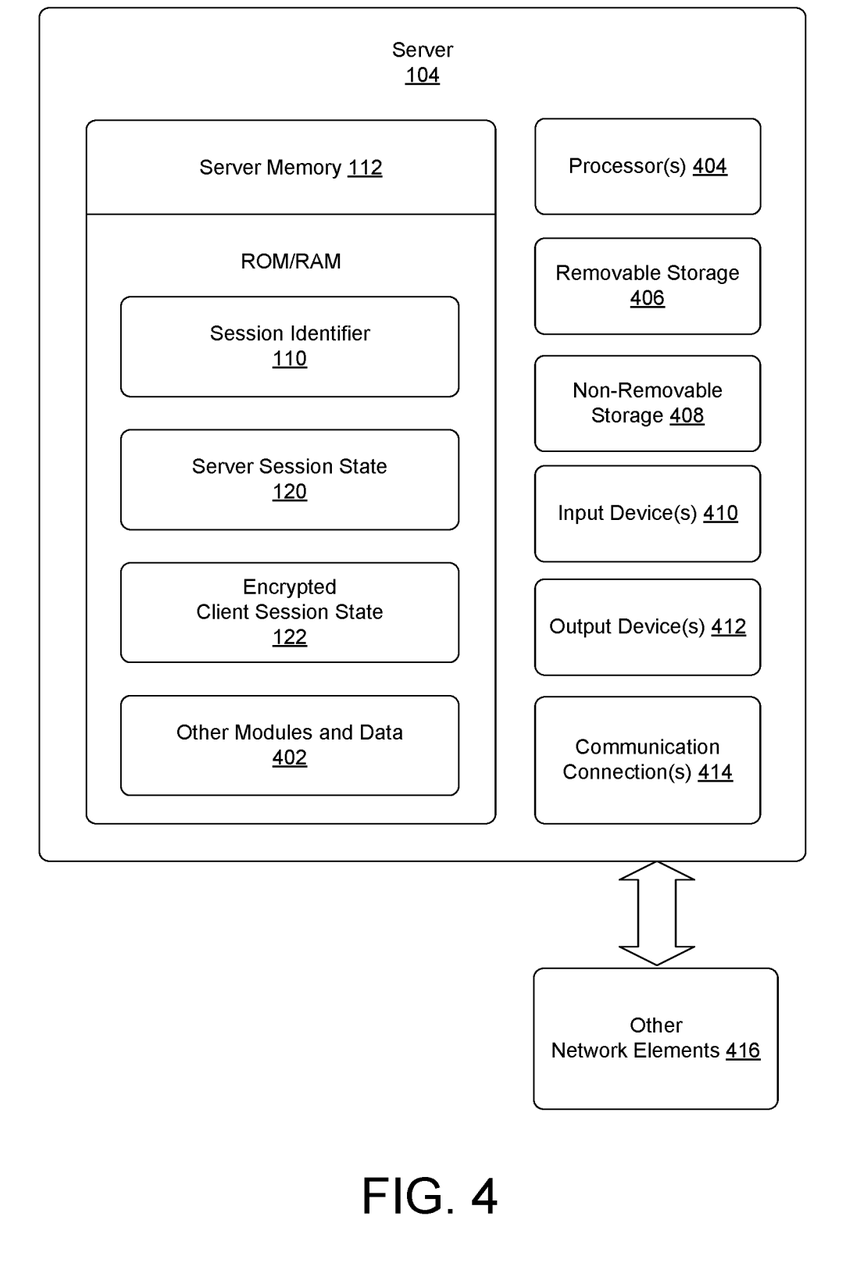
FIG. 4 shows an example system architecture for a server.

FIG. 4 depicts an example system architecture for the server 104. The server 104 can have, or be associated with, a server memory 112. In various examples, the server memory 112 can be volatile (such as RAM), non-volatile (such as ROM, flash memory, etc.), or some combination of the two. Example server memory 112 can include one or more of RAM, ROM, EEPROM, a Flash Memory, a hard drive, a memory card, an optical storage, a magnetic cassette, a magnetic tape, a magnetic disk storage or another magnetic storage devices, or any other medium. In some examples, the server memory 112 can be a global cache, database, or other shared memory that is accessible by multiple instances of the server 104 in a distributed set of servers 104.

The server memory 112 can store data for the server 104, or a distributed set of servers 104. For example, the server memory 112 can store a session identifier 110 and/or a connection identifier associated with a secure transport session 108 established with the constrained device 102, along with a server session state 120 associated with the established secure transport session 108. The server memory 112 can further store an encrypted client session state 122 in association with the session identifier 110 and/or the connection identifier. Accordingly, the server 104 can retrieve the server session state 120 and/or the encrypted client session state 122 from the server memory 112 based on the session identifier 110 and/or the corresponding connection identifier. The server memory 112 may also include other modules and data 402 utilized by the server 104 to perform or enable performing any action taken by the server 104. The other modules and data 402 can include a platform and applications, and data utilized by the platform and applications.

The server 104 can also include processor(s) 404, removable storage 406, non-removable storage 408, input device(s) 410, output device(s) 412, and/or communication connections 414 for communicating with other network elements 416.

In some embodiments, the processor(s) 404 can be a central processing unit (CPU), a graphics processing unit (GPU), both CPU and GPU, or other processing unit or component known in the art.

The server 104 can also include additional data storage devices (removable and/or non-removable) such as, for example, magnetic disks, optical disks, or tape. Such additional storage is illustrated in FIG. 4 by removable storage 406 and non-removable storage 408. Computer storage media may include volatile and nonvolatile, removable and non-removable media implemented in any method or technology for storage of information, such as computer readable instructions, data structures, program modules, or other data. The server memory 112, removable storage 406 and non-removable storage 408 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by the server 104. Any such computer-readable storage media can be part of the server 104. In various examples, any or all of the server memory 112, removable storage 406, and non-removable storage 408, store programming instructions which, when executed, implement some or all of the herein-described operations of the server 104.

In some examples, the server 104 can also have input device(s) 410, such as a keyboard, a mouse, a touch-sensitive display, voice input device, etc., and/or output device(s) 412 such as a display, speakers, a printer, etc. These devices are well known in the art and need not be discussed at length here.

The server 104 can also contain communication connections 414 that allow the server 104 to communicate with other network elements 416, such as elements of the network 106. For example, the server 104 can use the communication connections 418 to communicate with an access point, network gateway, and/or other network elements, as well as to communicate with the constrained device 102 via such network elements.

Example Operations

Figure 5:
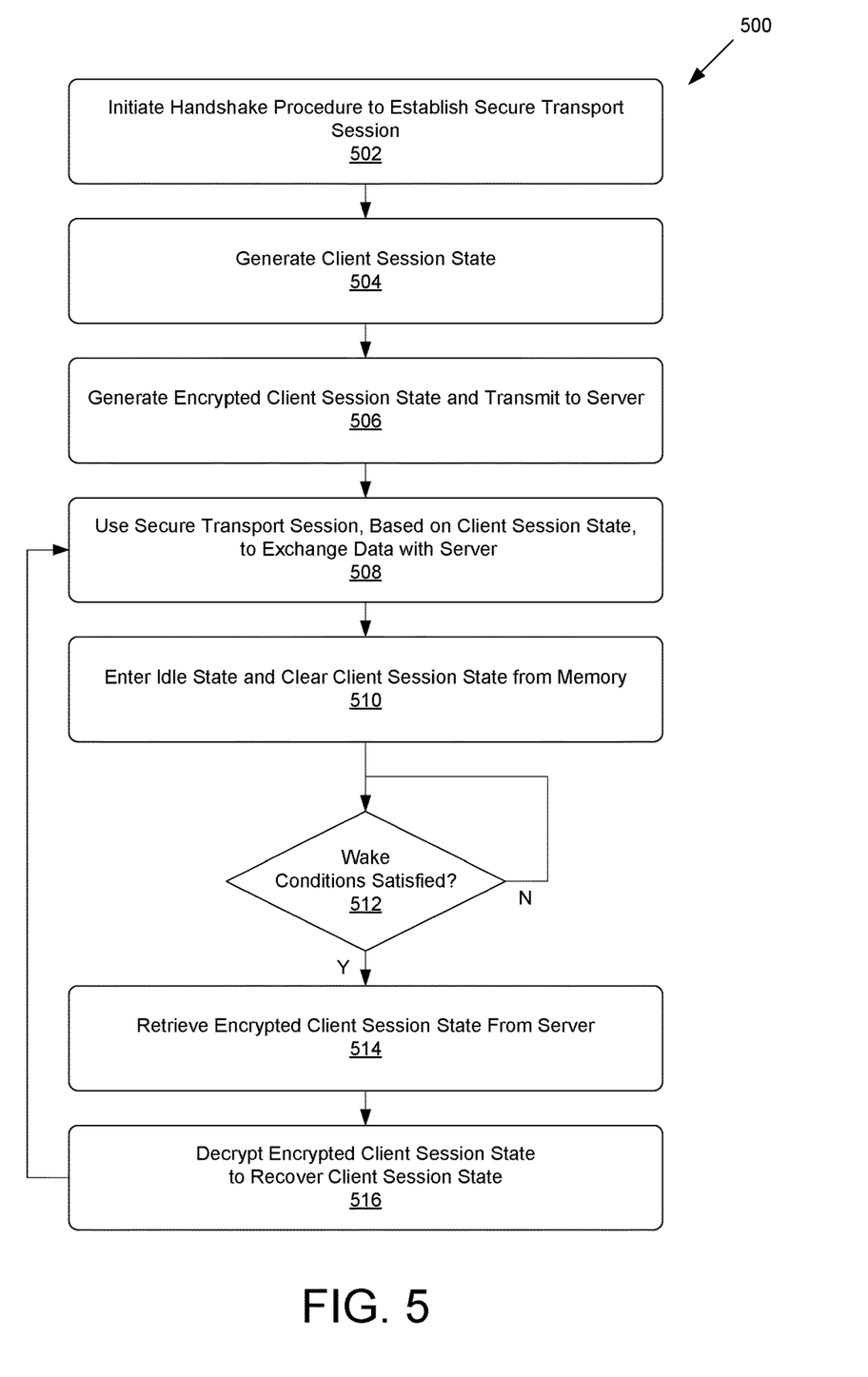
FIG. 5 shows a flowchart of an example method for a constrained device to establish and resume a secure transport session.

FIG. 5 shows a flowchart of an example method 500 for a constrained device to establish and resume a secure transport session 108.

At block 502, the constrained device 102 can initiate a handshake procedure to establish a secure transport session 108 with a server 104. For example, the constrained device 102 can transmit a "ClientHello" message, or other request message to the server 104 that requests establishment of a new secure transport session 108. The request message may include a client-initiated session resumption capability parameter that indicates, to the server 104, that the constrained device 102 supports resuming a previously-established secure transport session 108, based on a client session state 118 that the constrained device 102 decrypts from an encrypted client session state 122 received from the server 104. The handshake procedure can include the server 104 returning a "ServerHello" message or other acknowledgement message, which may acknowledge the client-initiated session resumption capability parameter and include data by which the constrained device 102 and the server 104 can establish the secure transport session 108. For example, the server's acknowledgement message may indicate the session identifier 110 associated with the secure transport session 108, a cipher suite by which the constrained device 102 and the server 104 can generate session keys for the secure transport session 108, and/or other data associated with the secure transport session 108.

At block 504, based on data exchanged as part of the handshake procedure, the constrained device 102 can generate a client session state 118 associated with the secure transport session 108. The client session state 118 may include an identifier of the cipher suite for the secure transport session 108, a master secret used by the constrained device 102 to generate session keys for the secure transport session 108, copies of the session keys for the secure transport session 108, and/or other data associated with the secure transport session 108. The constrained device 102 may store the client session state 118 and the session identifier 110 in memory 310 of the constrained device 102. In some examples, the constrained device 102 may store the client session state 118 in short-term memory 114, but store the session identifier 110 in long-term memory 116.

At block 506, the constrained device 102 can generate an encrypted client session state 122 and transmit the encrypted client session state 122 to the server 104. For example, the constrained device 102 can generate at least one client session state key 124 that is unknown to the server 104, and can generate the encrypted client session state 122 by encrypting the client session state 118 using the at least one client session state key 124. In some examples, the constrained device 102 can store the encrypted client session state 122 in memory 310, such as in the short-term memory 114, at least until the encrypted client session state 122 has been transmitted to the server 104. The constrained device can transmit the encrypted client session state 122 to the server 104 in association with the session identifier 110, such that the server 104 can store the encrypted client session state 122 in server memory 112 in association with the session identifier 110 and/or a corresponding connection identifier.

At block 508, the constrained device 102 can use the secure transport session 108 to send encrypted data to the server 104 and/or receive encrypted data to the server 104. For example, the constrained device 102 can use session keys in, or derivable from, the client session state 118 to encrypt and decrypt data transmitted during the secure transport session 108 at block 508.

At block 510, the constrained device 102 may enter an idle state, and can clear the client session state 118 from the memory 310 at, or before, a change from an active state to the idle state. For example, the client session state 118 can have been stored in short-term memory 114 at block 504, and data in the short-term memory 114, including the client session state 118, can be cleared upon the constrained device 102 entering the idle state. In some examples, the constrained device 102 may enter the idle state after the constrained device 102 has sent a set of pending data to the server 104 using the secure transport session 108. For instance, if the constrained device 102 is an IoT sensor that takes and reports measurements to the server 104, the IoT sensor can enter the idle state at block 510 after such measurements have been transmitted to the server 104.

At block 512, the constrained device 102 can determine if wake conditions have been satisfied. The wake conditions can be a schedule, rules, conditions, or other criteria that indicate if and/or when the constrained device 102 should exit the idle state and re-enter an active state. For example, the if the constrained device 102 is an IoT sensor that takes and reports measurements to the server 104, the IoT sensor may have wake conditions that indicate when the IoT sensor should wake from the idle state to the active state to take and report new measurements. If the wake conditions have not yet been satisfied at block 512, the constrained device 102 can wait until the wake conditions have been satisfied. Once the wake conditions have been satisfied at block 512, the constrained device 102 can wake from the idle state and re-enter the active state.

At block 514, after waking and re-entering the active state, the constrained device 102 can retrieve the encrypted client session state 122 from the server 104 or another instance of the server 104. For example, the constrained device 102 may transmit a "ClientHello" message, or other request message, to the server 104 that includes the session identifier 110 and one or more parameters indicating that the constrained device 102 is requesting resumption of a previously-established secure transport session 108 associated with that session identifier 110, and is not requesting a new secure transport session 108. In some examples, such parameters can include the same or a similar client-initiated session resumption capability parameter sent at block 502 and/or an explicit resumption parameter. The server 104 can respond by retrieving the encrypted client session state 122 from the server memory 112 based on the session identifier 110 or a corresponding connection identifier, and can return the encrypted client session state 122 to the constrained device 102 in a "ServerHello" message or other message.

At block 516, the constrained device 102 can decrypt the encrypted client session state 122, received from the server at block 514, to recover the client session state 118. The constrained device 102 may again temporarily store the client session state 118 in memory 310, such as in the short-term memory 114.

The constrained device 102 may then return to block 508 and use the recovered client session state 118 to send encrypted data to the server 104 and/or receive encrypted data to the server 104. For example, the constrained device 102 can use session keys in, or derivable from, the recovered client session state 118 to encrypt and decrypt data transmitted during the secure transport session 108 at block 508. When the constrained device 102 next enters the idle state at block 510, the recovered client session state 118 can again be cleared from the memory 310 of the constrained device 102. However, when the constrained device 102 wakes again, the constrained device 102 can again use block 514 and block 516 to again recover the client session state 118 in order to again resume the secure transport session 108.

Accordingly, although the constrained device 102 may initially perform block 502 through block 506 to initially establish the secure transport session 108, thereafter the constrained device 102 can cycle through blocks 508 to 516 as the constrained device 102 switches between the active state and the idle state. Cycling through blocks 508 to 516 can allow the constrained device to resume the previously-established secure transport session 110 upon waking from the idle state, without using block 502 through block 506 to establish a new secure transport session 108 and without generating a new client session state 118. Avoiding the establishment of a new secure transport session 108 and performing operations to generate new client session state 118 upon waking from the idle state can reduce the amount of energy used by the constrained device 102 and/or can reduce the number of messages sent over the network 106.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method, comprising:
   establishing, by a constrained device, a secure transport session with a server including receiving a session identifier associated with the secure transport session from the server;
   storing, by the constrained device,
      a client session state associated with the secure transport session in short-term memory of the constrained device, and
      the session identifier in long-term memory of the constrained device while the constrained device is in the idle state;
   generating, by the constrained device, an encrypted client session state by encrypting the client session state;
   transmitting, by the constrained device, the encrypted client session state to the server;
   terminating the secure transport session by clearing, by the constrained device, the client session state from the short-term memory upon the constrained device entering an idle state;
   transmitting, by the constrained device, a request for the encrypted client session state to the server upon the constrained device exiting the idle state, the request including the session identifier;
   receiving, by the constrained device from the server, the encrypted client session state associated with the session identifier;
   decrypting, by the constrained device, the encrypted client session state to recover the client session state; and
   resuming, by the constrained device, the secure transport session previously established using the client session state decrypted from the encrypted client session state.

2. The method of claim 1, wherein the client session state stored in the short-term memory is automatically cleared upon the constrained device entering the idle state.

3. The method of claim 1, further comprising generating, by the constrained device, at least one client session state key associated with the secure transport session, wherein the constrained device uses the at least one client session state key to generate the encrypted client session state and to decrypt the encrypted client session state.

4. The method of claim 3, further comprising storing, by the constrained device, the at least one client session state key in the long-term memory while the constrained device is in the idle state.

5. The method of claim 1, wherein the establishing comprises:
   sending, by the constrained device to the server, a request message including a client-initiated session resumption capability parameter; and
   receiving, by the constrained device from the server, an acknowledgement message including a client-initiated session resumption capability acknowledgement parameter.

6. The method of claim 1, wherein the request for the encrypted client session state includes one or more parameters indicating that the constrained device is requesting the encrypted client session state associated with the secure transport session.

7. The method of claim 1, wherein the constrained device is an Internet of Things (IoT) device.

8. The method of claim 1, wherein the secure transport session is a Transport Layer Security session or a Datagram Transport Layer Security session.

9. The method of claim 1, wherein the server is a distributed set of servers, the constrained device transmits the encrypted client session state to a first server instance of the distributed set of servers, the first server instance stores the encrypted client session state in shared server memory accessible by the distributed set of servers, and the constrained device receives the encrypted client session state from a second first server instance of the distributed set of servers in response to the request.

10. A constrained device, comprising:

one or more processors; and memory comprising long-term memory and short-term memory, the memory storing computer-executable instructions that, when executed by the one or more processors, cause the one or more processors to perform operations comprising:

establishing a secure transport session with a server including receiving a session identifier associated with the secure transport session from the server;

storing a client session state associated with the secure transport session in the short-term memory and the session identifier in the long-term memory;

generating an encrypted client session state by encrypting the client session state;

transmitting the encrypted client session state to the server;

terminating the secure transport session by clearing the client session state from the short-term memory upon the constrained device entering an idle state;

transmitting a request for the encrypted client session state to the server upon the constrained device exiting the idle state, the request including the session identifier;

receiving the encrypted client session state associated with the session identifier from the server;

decrypting the encrypted client session state to recover the client session state; and resuming the secure transport session previously established using the client session state decrypted from the encrypted client session state, wherein the short-term memory is automatically cleared upon the constrained device entering the idle state.

11. The constrained device of claim 10, wherein the operations further comprise storing, in the long-term memory, at least one client session state key the constrained device uses to encrypt and decrypt the encrypted client session state.

12. The constrained device of claim 10, wherein the constrained device is an Internet of Things (IoT) device.

13. The constrained device of claim 10, wherein the secure transport session is a Transport Layer Security session or a Datagram Transport Layer Security session.

14. One or more non-transitory computer-readable media storing computer-executable instructions that, when executed by one or more processors of a constrained device, cause the constrained device to perform operations comprising:

establishing a secure transport session with a server including receiving a session identifier associated with the secure transport session from the server;

storing a client session state associated with the secure transport session in short-term memory of the constrained device and the session identifier in long-term memory of the constrained device;

generating an encrypted client session state by encrypting the client session state;

transmitting the encrypted client session state to the server;

terminating the secure transport session by clearing the client session state from the short-term memory upon the constrained device entering an idle state;

transmitting a request for the encrypted client session state to the server upon the constrained device exiting the idle state, the request including the session identifier;

receiving the encrypted client session state from the server associated with the session identifier;

decrypting the encrypted client session state to recover the client session state; and resuming the secure transport session previously established using the client session state decrypted from the encrypted client session state, wherein the client session state stored in the short-term memory is automatically cleared upon the constrained device entering the idle state.

15. The one or more non-transitory computer-readable media of claim 14, wherein the operations further comprise:

generating at least one client session state key associated with the secure transport session; and storing the at least one client session state key in the long-term memory while the constrained device is in the idle state, wherein the constrained device uses the at least one client session state key to generate the encrypted client session state and to decrypt the encrypted client session state.

16. The one or more non-transitory computer-readable media of claim 14, wherein the storing the session identifier in the long-term memory includes storing the session identifier in the long-term memory while the constrained device is in the idle state.

17. The one or more non-transitory computer-readable media of claim 14, wherein the secure transport session is a Transport Layer Security session or a Datagram Transport Layer Security session.

* * * * *